United States Patent
Moncarz et al.

(10) Patent No.: US 11,953,238 B1
(45) Date of Patent: Apr. 9, 2024

(54) SYSTEMS AND METHODS FOR THERMAL REACH ENHANCEMENT

(71) Applicant: XGS Energy, Inc., Palo Alto, CA (US)

(72) Inventors: Piotr D. Moncarz, Palo Alto, CA (US); Poodipeddi V. Suryanarayana, Plano, TX (US); Louis Capuano, Jr., Palo Alto, CA (US); Axel-Pierre Bois, Curis-au-Mont-D+3 Or (FR); Daniel Bour, Granite Falls, WA (US)

(73) Assignee: XGS Energy, Inc., Palo Alto, CA (US)

( * ) Notice: Subject to any disclaimer, the term of this patent is extended or adjusted under 35 U.S.C. 154(b) by 0 days.

(21) Appl. No.: 18/179,805

(22) Filed: Mar. 7, 2023

Related U.S. Application Data

(63) Continuation of application No. PCT/US2023/061379, filed on Jan. 26, 2023.

(60) Provisional application No. 63/305,658, filed on Feb. 1, 2022.

(51) Int. Cl.
| | |
|---|---|
| *F24T 10/17* | (2018.01) |
| *C09K 5/14* | (2006.01) |
| *C09K 8/504* | (2006.01) |
| *E21B 43/26* | (2006.01) |
| *F24T 10/00* | (2018.01) |

(52) U.S. Cl.
CPC ............... *F24T 10/17* (2018.05); *C09K 5/14* (2013.01); *C09K 8/5045* (2013.01); *E21B 43/26* (2013.01); *F24T 2010/50* (2018.05)

(58) Field of Classification Search
CPC ........ E21B 43/267; E21B 43/26; E21B 43/24; E21B 43/247; E21B 33/14
See application file for complete search history.

(56) References Cited

U.S. PATENT DOCUMENTS

| | | |
|---|---|---|
| 4,912,941 A | 4/1990 | Buchi |
| 6,251,179 B1 | 6/2001 | Allan |
| 6,668,554 B1 | 12/2003 | Brown |
| 6,672,371 B1 | 1/2004 | Amerman et al. |
| 7,067,004 B2 | 6/2006 | Matula et al. |
| 7,452,417 B2 | 11/2008 | Matula et al. |
| 8,272,437 B2 | 9/2012 | Bour et al. |
| 8,616,000 B2 | 12/2013 | Parrella |
| 8,640,772 B2 | 2/2014 | Bour et al. |
| 9,091,460 B2 | 7/2015 | Parrella |
| 9,149,439 B2 | 10/2015 | Patel et al. |
| 9,376,885 B2 | 6/2016 | Bour et al. |

(Continued)

FOREIGN PATENT DOCUMENTS

WO 2022018674 A1 1/2022

OTHER PUBLICATIONS

Translation of HU 193647. (Year: 1987).*

*Primary Examiner* — Zakiya W Bates
(74) *Attorney, Agent, or Firm* — Martin Fessenmaier; Umberg Zipser LLP

(57) ABSTRACT

A thermal reach enhanced geothermal wellbore has a plurality of fissures at a target location that distally extend into the formation and that are at least partially filled with a compacted high-thermal k material. The compacted high-thermal k material terminates on a proximal end of the fissure at the target location of the wellbore and is thermally coupled to a high-thermal conductivity grout or slurry through which heat is conducted to a working fluid that is contained in a closed loop working fluid conduit embedded in the grout or slurry.

16 Claims, 3 Drawing Sheets

(56) References Cited

U.S. PATENT DOCUMENTS

| | | |
|---|---|---|
| 9,845,423 B2 | 12/2017 | Frantz et al. |
| 9,896,619 B2 | 2/2018 | Nguyen et al. |
| 10,113,106 B2 | 10/2018 | Wadekar |
| 10,927,604 B2 | 2/2021 | Danko |
| 10,954,924 B2 | 3/2021 | Moncarz et al. |
| 11,085,671 B2 | 8/2021 | Gheysens |
| 11,125,471 B2 | 9/2021 | Marsh et al. |
| 11,220,882 B2 | 1/2022 | Nevison et al. |
| 11,299,970 B2 | 4/2022 | Cook |
| 2003/0187583 A1 | 10/2003 | Martin et al. |
| 2005/0269090 A1* | 12/2005 | Vinegar ................ E21B 43/122 |
| | | 166/302 |
| 2006/0210631 A1 | 9/2006 | Patel et al. |
| 2007/0125274 A1 | 6/2007 | Miller |
| 2007/0163805 A1 | 7/2007 | Trevisani |
| 2008/0223041 A1 | 9/2008 | Reynolds |
| 2009/0211757 A1 | 8/2009 | Riley |
| 2011/0232858 A1 | 9/2011 | Hara |
| 2012/0247766 A1 | 10/2012 | Hemmings |
| 2020/0191444 A1* | 6/2020 | Nevison ................ E21B 41/00 |
| 2021/0071063 A1 | 3/2021 | Stone |
| 2021/0348804 A1 | 11/2021 | Marsh et al. |
| 2021/0356174 A1 | 11/2021 | Alharbi et al. |
| 2021/0396430 A1 | 12/2021 | Cook et al. |

\* cited by examiner

SYSTEMS AND METHODS FOR THERMAL REACH ENHANCEMENT

This application is a bypass continuation of currently International Application with the serial number PCT/US23/61379, which was filed Jan. 26, 2023, and which claims priority to U.S. provisional patent application with the Ser. No. 63/305,658, which was filed Feb. 1, 2022, and which is incorporated by reference herein.

FIELD OF THE INVENTION

The field of the invention is systems and methods for heat harvesting in geologic heat recovery, and particularly as it relates to systems and methods that provide extended reach via high thermal conductivity materials that extend into fissures beyond a wellbore.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Geothermal wells have been used to provide heating and cooling systems that transfer heat to and from the ground. In a typical vertical closed well loop system, two pipes joined by a U-shaped connector at the bottom, forming a continuous casing, are placed vertically in a wellbore drilled in a subterranean formation (see U.S. Pat. App. Pub. No. 2012/0247766). This type of system is generally used for heating and cooling residential and commercial buildings. In such systems, conventional grout mixtures are typically clay-based and pumped into a wellbore to fill the annular space between the casing and the formation. The resulting grout forms a seal to prevent contamination of the subsurface from above ground, as well as preventing groundwater contamination. The grout mixture may further include thermally conductive materials to aid in transferring heat between the working fluid in the casing and the target location. For example, a working fluid may be circulated through the well loop to transfer heat to and from a heat exchanger at the surface. Unfortunately, most, if not all of these systems are not suitable for heat harvesting in an amount that is sufficient for power generation.

Indeed, the vertical design of conventional geothermal wells often limits the ability to reach a target location within a geological formation suitable for heat energy extraction for power generation. To increase heat harvest, the geothermal wells must be increased in length or width to increase the amount of surface area that is in contact with the geological formation. However, such solutions are typically expensive and can be technically challenging.

For example, U.S. Pat. No. 11,220,882 describes recompletion of a previously completed well for hydrocarbon production using high thermal k proppant materials that displace a reservoir fluid in existing fractures. To that end, a slurry comprising a carrier fluid and graphite as a thermally conductive material is injected into a propped fracture, and the slurry is expected to dehydrate as the carrier fluid flows into the surrounding reservoir, thereby resulting in a porous graphite solid in proximity to the recompleted well. Similarly, US App. Pub. 2020/0191444 teaches use of carbon-based high-thermal k materials and particulates as well as settleable materials as thermally conductive materials in recompleted wells. In some embodiments, the existing hydrocarbon well can be further fracked, and high-thermal k materials can be placed into the fractures after the fractures were formed. While such methods can advantageously make use of already existing wellbores, they are typically not suitable for high-temperature target locations, particularly where dry hot rock is present. As such, power generation from geoheat is generally not achieved with such methods. Moreover, such methods are limited to locations that already have pre-existing hydrocarbon production wells, which significantly limits their deployment at locations where heat harvest is desired. Still further, such methods require hydraulic isolation from adjacent reservoirs, and failure of such isolation will compromise he adjacent well and the adversely affect recompletion.

In another example, WO 2022/018674 teaches geothermal energy harvesting using both conductive and convective heat transfer in which a geothermal well has an inlet well bore, an outlet wellbore, and a typically horizontally extending interconnecting wellbore therebetween. Here, the interconnecting wellbore is fluidly connected to a number of conduits such as fractures, and heat is conductively and convectively transferred to the interconnecting wellbore. However, as the interconnecting wellbore must be sealed with a sealant that prevents fluid exchange between the geothermal well and the surrounding subterranean zone, construction of such structure is relatively complex.

To simplify heat transfer in a formation, graphitic materials can be used at the bottom of a borehole and additional conduits may be drilled adjacent to the borehole and filled with a graphitic material as is described in US 2011/0232858. While conceptually more simple, heat transfer in such systems from the formation into a working fluid is typically less than desirable.

To increase heat transfer, a bottom portion of a borehole can be expanded in successive steps as described in U.S. Pat. No. 4,912,941. Here, the bottom portion of the borehole is subjected to successive steps of blasting or fracturing with subsequent flushing out of broken up rock to generate newly generated passages in addition to already existing passages in the rock. These passages are then filled with a cementitious material that may include siliceous gel and/or metal powders and left to solidify. The so solidified material is then blasted or reamed to form a roughly cylindrical chamber into which a casing of a heat exchanger is placed and grouted in place. While such method at least somewhat increases heat transfer, placement of the thermally conductive material is cumbersome. Moreover, and especially at high temperatures in the target location, placement of the grout that encloses the heat exchange casing will typically be problematic as the grout will set before reaching the target location due to the high temperature.

Thus, even though various systems, compositions, and methods for enhancing thermal reach in a geothermal wellbore are known in the art, all or almost all of them suffer from several drawbacks. Therefore, there remains a need for improved systems, compositions, and methods for enhancing thermal reach in a geothermal wellbore.

SUMMARY OF THE INVENTION

The inventive subject matter is directed to various systems, compositions, and methods for geothermal wellbores having enhanced thermal reach, and particularly methods of forming such enhanced wellbores, and methods of extracting heat from a formation using such enhanced wellbores. In especially contemplated embodiments, a geothermal wellbore includes compacted high-thermal k material that is disposed in fissures extending from the wellbores, and especially wellbores utilizing closed loop geothermal system wells for geothermic power production. The compacted high-thermal k material in the fissures, along with the large surface area of the fissures, advantageously provides improved heat transfer from a target location. This improved heat transfer results in greater thermal energy capture into a working fluid, thereby increasing revenue generation for power generating wells.

In one aspect of the inventive subject matter, the inventors contemplate a method of enhancing thermal reach in a geothermal wellbore. The method includes pumping a fluid (e.g., water) into a wellbore to a target location in a formation. In certain embodiments, the target location extends in a substantially vertical orientation at least 500 ft below ground and has a target temperature of at least 300° C., at least 400° C., or at least 500° C. Such methods further include a step of increasing pressure of the fluid at the target location to a fracture pressure that is sufficient to open a plurality of fissures in the formation. In various embodiments, the fissures extend distally from the wellbore over a distance of at least 3 feet.

Contemplated methods will also include a step of pumping at the fracture pressure or a pressure above the fracture pressure a slurry including a high-thermal k material dispersed in a carrier fluid into the wellbore to allow the slurry to at least partially fill the fissures. The slurry may include water and optionally a plasticizer, a surfactant, and/or an organic polymer. In some embodiments, the slurry will not include a cementitious material and as such can be placed at even high temperatures without curing or setting. Suitable high-thermal k materials include graphite powder, flaked graphite, pyrolytic graphite, desulfurized petroleum coke, graphene, fly ash, copper powder, aluminum nitride, and silicon carbide.

Contemplated methods further include a later step of reducing pressure at the target location and the fissures in an amount sufficient to partially close the fissures to so expel at least some of the carrier fluid from the slurry in the fissures, thereby creating fissures containing compacted high-thermal k material. The compacted high-thermal k material terminates on a proximal end at the wellbore and on a distal end within the formation. The compacted high-thermal k material may have a solids content of at least 10% or at least 25% by volume, and a thermal conductivity of at least 20 W/m° K., at least 40 W/m° K., or at least 80 W/m° K.

Contemplated methods may also include a step of installing a high-thermal conductivity composition in the wellbore, wherein the high-thermal conductivity composition contacts the proximal end of the compacted high-thermal k material and an outer surface of a casing located in the wellbore. In one embodiment, the high-thermal conductivity composition is a high-thermal conductivity grout. In another embodiment, the high-thermal conductivity composition is a compacted high-thermal conductivity slurry. Therefore, it should be appreciated that the high-thermal conductivity composition in the wellbore will have a composition that is different form the composition of the compacted high-thermal k material in the fissures.

Consequently, the inventors also contemplate a thermal reach enhanced geothermal wellbore. The geothermal wellbore includes a wellbore extending from a topside surface to a target location in a formation. In certain embodiments, the target location is at least 500 ft below ground and has a target temperature of at least 300° C., at least 400° C., or at least 500° C. The geothermal wellbore further includes a plurality of fissures that distally extend from the target location into the formation. In various embodiments, the fissures distally extend from the wellbore over a distance of at least 3 feet.

It is contemplated that the fissures are at least partially filled with a compacted high-thermal k material. The compacted high-thermal k material terminates on a proximal end at the target location of the wellbore. In certain embodiments, the high-thermal k material comprises graphite powder, flaked graphite, pyrolytic graphite, desulfurized petroleum coke, graphene, fly ash, copper powder, aluminum nitride, and silicon carbide. Therefore, the compacted high-thermal k material may have a thermal conductivity of at least 20 W/m° K., at least 40 W/m° K., or at least 80 W/m° K.

In various embodiments, the geothermal wellbore will further include a casing having an outer surface located in the wellbore. In these and other embodiments, the wellbore further includes a high-thermal conductivity composition that contacts the proximal end of the compacted high-thermal k material and the outer surface of the casing located in the wellbore. In one embodiment, the high-thermal conductivity composition is a high-thermal conductivity grout. In another embodiment, the high-thermal conductivity composition is a compacted high-thermal conductivity slurry. As such, the high-thermal conductivity grout or slurry will have a different composition from the compacted high-thermal k material in the fissures.

In yet another aspect of the inventive subject matter, the inventors contemplate a method of extracting heat from a formation. The method includes placing a closed loop working fluid conduit in a wellbore having a target location in the formation. In certain embodiments, the target location is at least 500 ft below ground and has a target temperature of at least 300° C., at least 400° C., or at least 500° C. The closed loop working fluid conduit is thermally coupled to a high-thermal conductivity composition. In one embodiment, the high-thermal conductivity composition is a high-thermal conductivity grout. In another embodiment, the high-thermal conductivity composition is a compacted high-thermal conductivity slurry.

It is contemplated that the formation at the target location includes a plurality of fissures that may distally extend from the wellbore over a distance of at least 3 feet. The high-thermal conductivity composition then contacts a compacted high-thermal k material that extends from the target location into the plurality of fissures in the formation. Contemplated methods further include transferring heat from the formation via the high-thermal k material in the fissures and the high-thermal conductivity composition to a working fluid in the closed loop working fluid conduit. In certain embodiments, the high-thermal k material comprises graphite powder, flaked graphite, pyrolytic graphite, desulfurized petroleum coke, graphene, fly ash, copper powder, aluminum nitride, and silicon carbide. Most typically, the compacted high-thermal k material will have a solids content of at least 10% or at least 25% by volume, and a thermal conductivity of at least 20 W/m° K., at least 40 W/m° K., or at least 80 W/m° K.

Various objects, features, aspects, and advantages of the inventive subject matter will become more apparent from the following detailed description of preferred embodiments, along with the accompanying drawing figures in which like numerals represent like components.

DETAILED DESCRIPTION

The inventors have discovered that geothermal wellbores with enhanced thermal reach can be produced in a conceptually simple and effective manner. Advantageously, contemplated thermal reach enhanced geothermal wellbores include a compacted high-thermal k material that is located in fissures at a target location in a formation in which the fissures distally extend from the wellbores. The compacted high-thermal k material in the fissures, along with the large surface area of the fissures, provide significantly improved heat transfer from the target location to the wellbore. Notably, the compacted high-thermal k material in the fissures will not require curable materials (e.g., cementitious materials) and can therefore be installed into the fissures even at high temperatures. Contemplated wellbores further contain a high-thermal conductivity composition that is in thermal exchange with the compacted high-thermal k material in the fissures on one side and the casing of a closed loop working fluid conduit in the wellbore on the other side. Consequently, it should be appreciated that geothermal wellbores with enhanced thermal reach can be formed in a simple and effective manner and that such geothermal wellbores allow for increased thermal energy capture into a working fluid, thereby increasing revenue generation for power generating wells.

Figure 1:
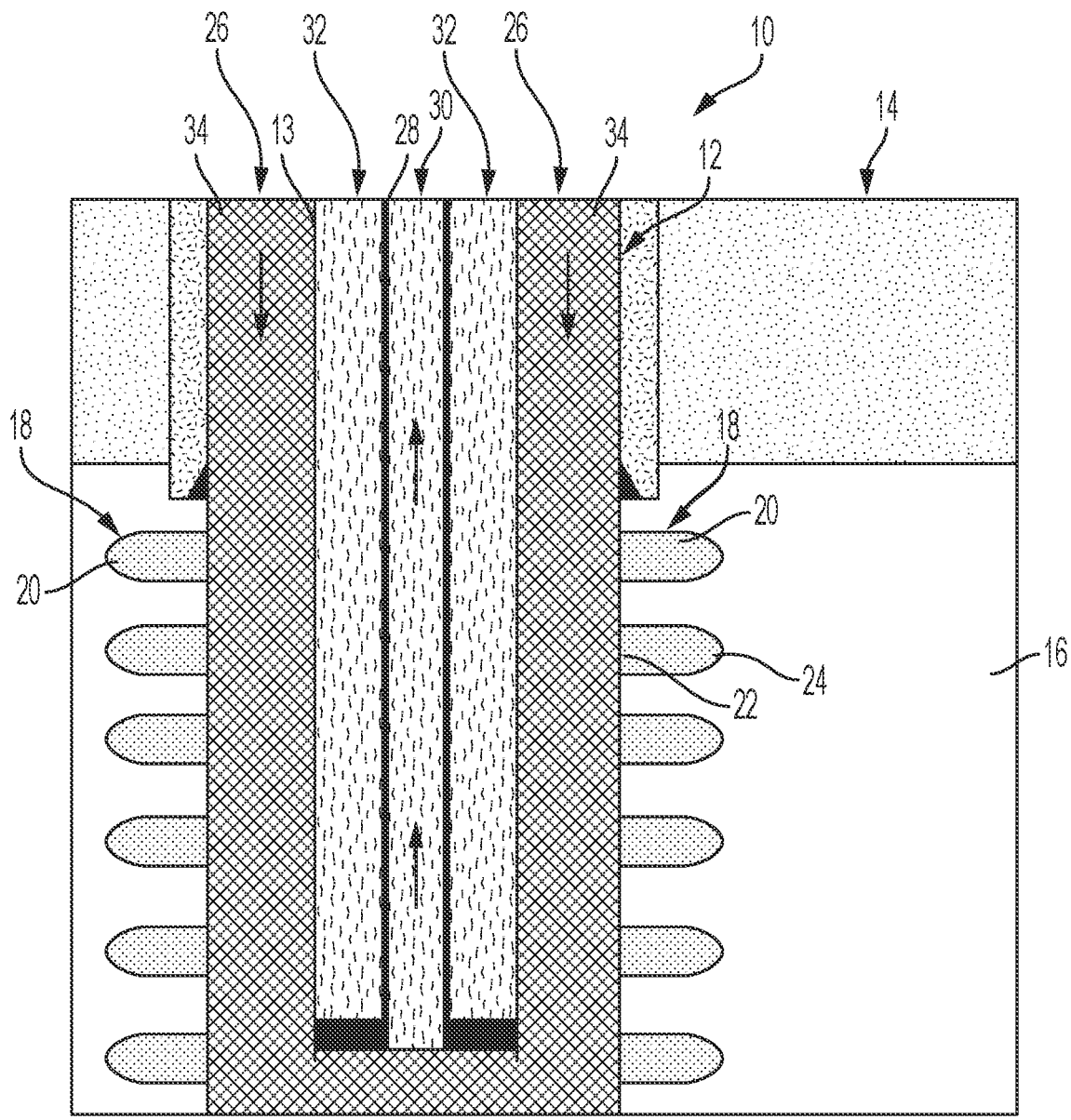
FIG. 1 is a schematic view of one exemplary method step in which a high-thermal k material is placed into fissures at a target location in a formation.
Figure 2:
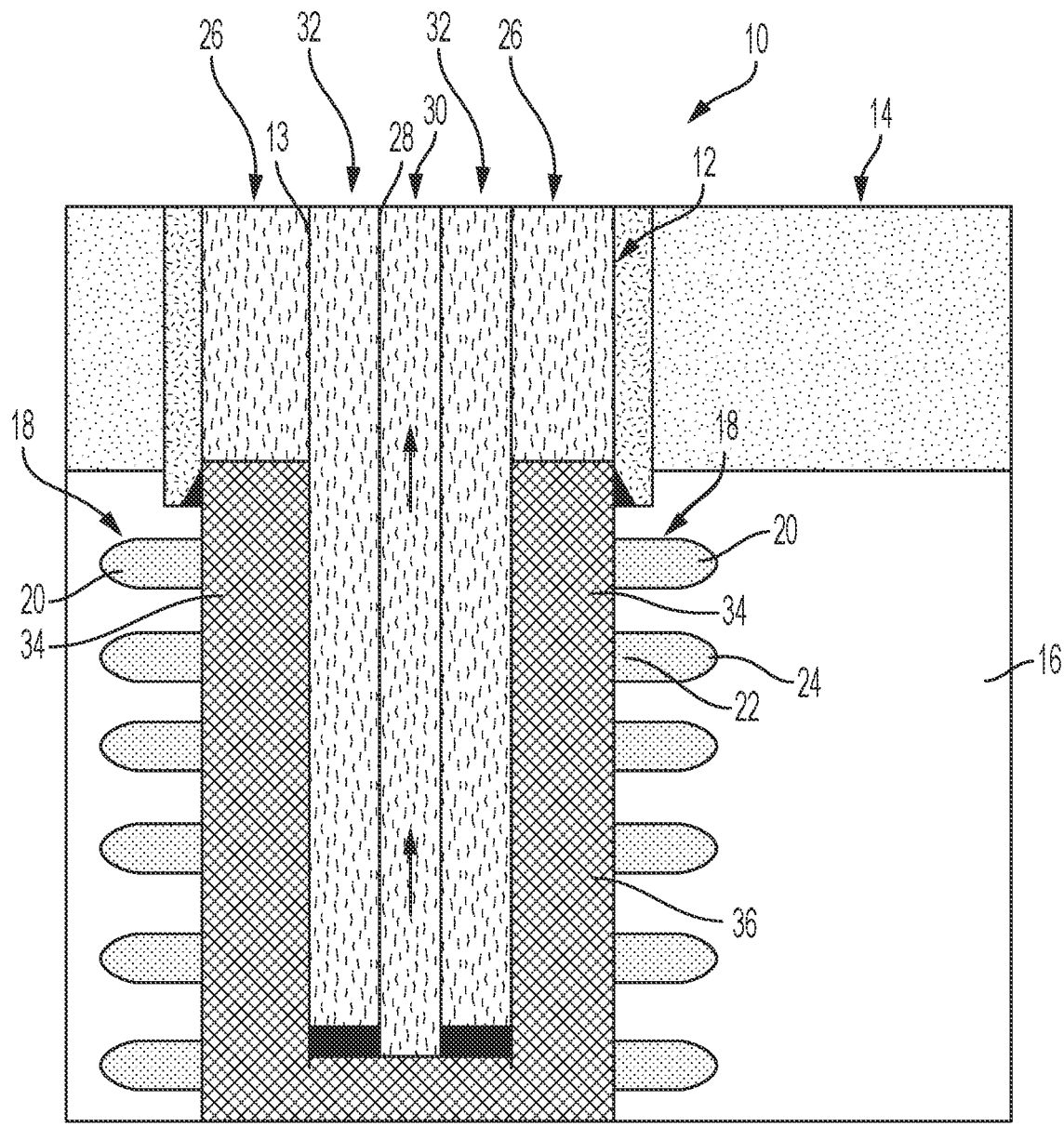
FIG. 2 is a schematic view of another exemplary method step in which a high-thermal conductivity composition is placed at the target location to thermally couple the high-thermal k material with the casing of a closed loop working fluid conduit.
Figure 3:
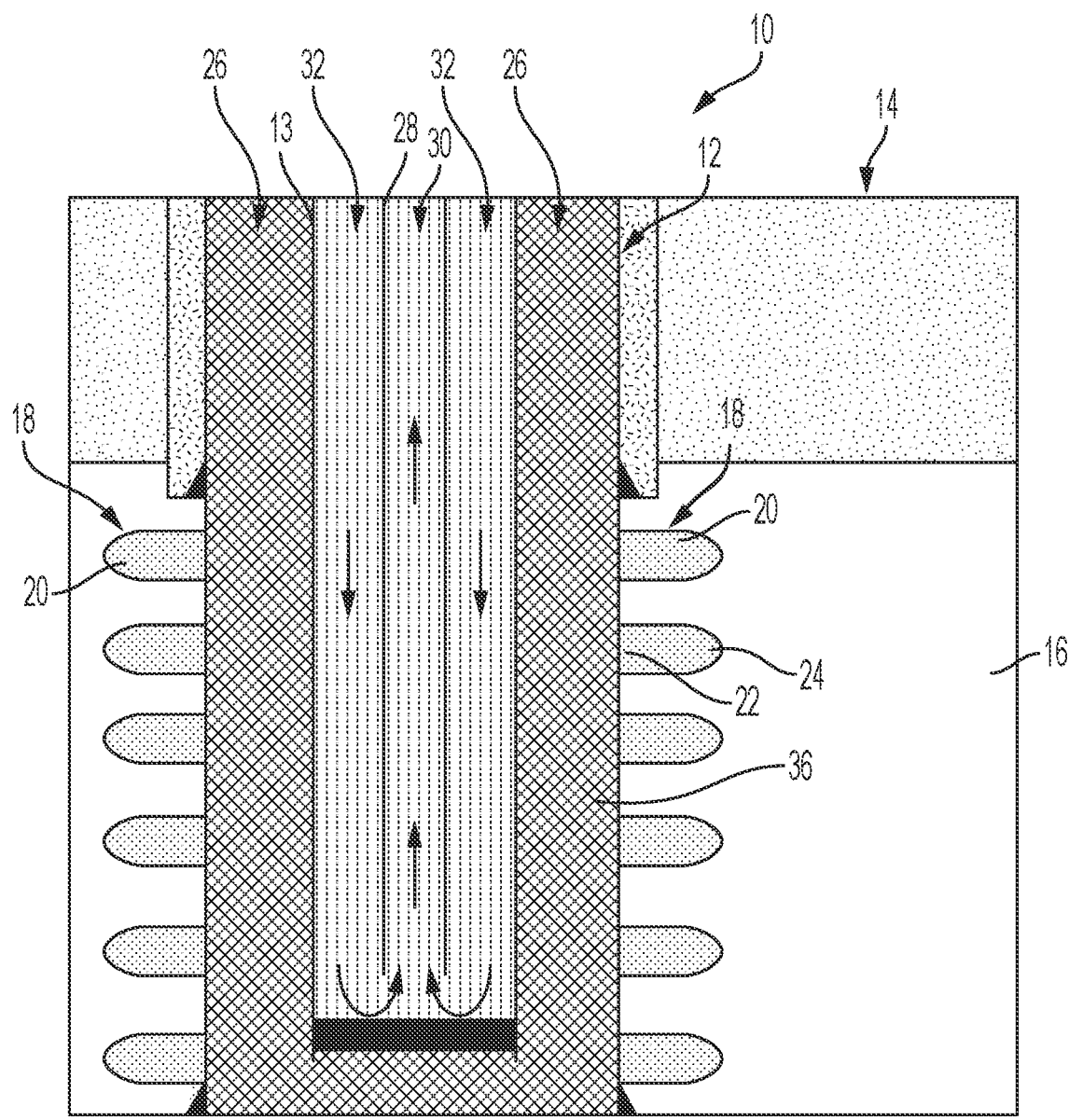
FIG. 3 is a schematic view of operation of an exemplary enhanced thermal reach geothermal wellbore according to the inventive subject matter.

With reference to FIGS. 1-3, a thermal reach enhanced geothermal wellbore 10 includes a wellbore 12 extending from a topside surface 14 to a target location within geological formation 16. In typical examples, the target location has a target temperature of at least 300° C., at least 350° C., at least 400° C., at least 450° C., or at least 500° C., and/or the target location may be below ground at a depth of at least 500 feet, at least 600 feet, at least 700 feet, at least 800 feet, at least 900 feet, at least 1,000 feet, at least 1,250 feet, at least 1,500 feet, at least 1,750 feet, at least 2,000 feet, at least 2,500 feet, at least 3,000 feet, at least 4,000 feet, or at least 5,000 feet.

In certain embodiments, the target location extends in a substantially vertical orientation. The term "substantially" as utilized herein means that the target location extends toward the center of the earth but may be offset from the center by no greater than 15 degrees, no greater than 10 degrees, no greater than 5 degrees, or no greater than 1 degree. It is to be appreciated that the geothermal wellbore 10 may have multiple target locations and thus may have both substantially vertical orientated target locations and target locations extending in orientations that are at least 30 degrees.

The formation 16, typically a hot dry rock (e.g., intrusive igneous or metamorphic rock), includes a plurality of fissures 18 that distally extend from the wellbore 12 at the target location into the formation 16. In various embodiments, the fissures distally extend from the wellbore over a distance of at least 3 feet, at least 4 feet, at least 5 feet, at least 6 feet, at least 7 feet, at least 8 feet, at least 9 feet, or at least 10 feet, and even more. The fissures 18 are at least partially filled with a compacted high-thermal k material 20. In various embodiments, at least 10%, at least 20%, at least 30%, at least 40%, at least 50%, at least 60%, at least 70%, at least 80%, or at least 90%, and even more, of the volume of each of the fissures 18 contains the compacted high-thermal k material 20.

In this context it should be noted that the compacted high-thermal k material 20 will typically terminate on a proximal end 22 at the target location of the wellbore 12 such that the compacted high-thermal k material 20 is in thermal exchange with a high-thermal conductivity composition in the wellbore 12. Furthermore, the compacted high-thermal k material 20 will terminate on a distal end 24 within the formation 16. Therefore, it should be appreciated that the compacted high-thermal k material 20 of the fissures 18 provides additional thermally conductive surfaces to improve heat extraction from target areas within the formation as opposed to only surfaces of the formation immediately adjacent to the wellbore 12. Viewed from a different perspective, the compacted high-thermal k material in the fissures will act as a radiator fin or heat exchange surface that provide significantly improved heat transfer on a per unit length basis of the wellbore 12, which in turn increases revenue generation for power producing wells.

With continuing reference to FIGS. 1-3, the geothermal wellbore 10 will further include a casing 13 of a closed loop working fluid conduit, wherein the casing has an outer surface located in the wellbore 12 such that an annular space 26 is formed between the wellbore 12 and the outer surface of the casing 13. Fluidly coupled to the closed loop working fluid conduit will be a circulating pump (not shown) at topside 14, and a heat exchanger or other heat transfer device that is operably coupled to drive a power generator (typically an electrical generator via a turbine, not shown). In the example of FIGS. 1-3, the closed loop working fluid conduit includes an inner conduit 28 that defines a return space 30. Inner conduit 28 is located within the casing 13 and so forms a second annular space 32. In various embodiments, the casing 13 and the inner conduit 28 cooperate to form a closed loop working fluid conduit.

Thermal reach enhanced geothermal wellbores will typically be produced in a series of steps in which after a wellbore is placed to reach a target location in a formation, a plurality of fissures are generated at the target location, typically by pressuring a fluid in the wellbore to a fracture pressure to thereby open a plurality of fissures at the target location in the formation. In most embodiments of contemplated methods, the pressure is then maintained at or above the fracture pressure to so maintain the freshly created fissures open. A slurry comprising a high-thermal k material dispersed in a carrier fluid is then pumped at or above the fracture pressure into the wellbore to allow the slurry to at least partially fill the freshly created fissures. Upon at least partial filling of the fissures, the pressure is then gradually reduced to so at least partially close the fissures, which will expel at least some of the carrier fluid from the slurry in the fissures back into the wellbore. Consequently, as the fissures settle back down, any high-thermal k material placed into the fissures will be compacted and held in place by the weight of the rock formation. Viewed from a different perspective, the former void space in the opened fissures will be replaced by the high-thermal k material, which is then compacted by the reduction in pressure to form a contiguous path distally extending into the formation.

Notably, as the rock formation will compress and thereby retain the high-thermal k material, no cementitious material is needed to hold the high-thermal k material in place. Moreover, the compressed high-thermal k material will have minimized content of air or fluid and as such be more effective in conductive heat transfer as compared to passively filled fissures. Still further, it should be appreciated that the compacted high-thermal k material will terminate at the beginning of a fracture, proximal to the wellbore. As such, and upon installation of the compacted high-thermal k material, the compacted high-thermal k material can be placed directly into contact with a high-thermal conductivity composition that transfers heat from the compacted high-thermal k material to the casing of a closed loop working fluid conduit.

Use of a second, and compositionally distinct high-thermal conductivity composition is especially beneficial as the high-thermal conductivity composition can be independently installed and as the high-thermal conductivity composition can have different thermal conductive properties than the compacted high-thermal k material to so optimize heat transfer form the target location to the working fluid. In addition, and where desired, the high-thermal conductivity composition may also comprise a cementitious component to help grout the closed loop working fluid conduit into place while also being directly thermally coupled to the proximal portion of the compacted high-thermal k material. Alternatively, the high-thermal conductivity composition may also be a non-cementitious slurry. Regardless of the particular composition, it should be appreciated that he high-thermal conductivity composition will be directly thermally coupled to the compacted high-thermal k material while also maintaining intimate thermal contact with the casing of a closed loop working fluid conduit at the target location.

FIG. 1 depicts a schematic view of one exemplary method step in which a high-thermal k material (e.g., flaked graphite) is placed into fissures at a target location in a formation. Here, a plurality of fissures are first formed in the target location by pressurization of an aqueous solution of a fracture fluid at the target location. In the example of FIG. 1, the fracture fluid is then replaced at or above fracture pressure by aqueous slurry of flaked graphite 34, preferably by pumping the slurry through annular space 26. As can be readily seen from FIG. 1, the inner conduit 28 can be used to withdraw the fracture fluid and the slurry, typically by replacement with a fresh fluid through annular space 26. As will be readily appreciated, the specific fracture pressure will to a large degree be determined by the type of rock in the formation and the size or extent of fissures.

The fracture fluid may be held at the fracture pressure and a time sufficient to generate fractures at a desired size/extent, and the skilled artisan will be readily apprised of the generation of the fissures. Therefore, the fracture fluid may be held at the fracture pressure for a time period of at least 1 minute, at least 5 minutes, at least 10 minutes, at least 30 minutes, at least 60 minutes, at least 120 minutes, at least 240 minutes, or at least 24 hours, and even more. The fracture fluid may be held at the increased pressure for a time period of no greater than 48 hours, no greater than 24 hours, no greater than 240 minutes, no greater than 120 minutes, no greater than 60 minutes, no greater than 30 minutes, no greater than 10 minutes, no greater than 5 minutes, or no greater than 1 minute, and even less. Thus, the fracture fluid may be held at the increased pressure for a time period of from 1 minutes to 48 hours, from 30 minutes to 24 hours, or from 60 minutes to 240 minutes.

Upon conclusion of the fissure formation, the fracture fluid will be replaced by a slurry comprising the high-thermal k material, typically at a pressure that maintains the fissures in an open configuration. As noted above, replacement will preferably through annular space 26 and inner conduit 28. As such, the slurry will be at least at fracture pressure, and most typically at least somewhat above fracture pressure and for a time sufficient to allow for circulation and penetration of the high-thermal k material into the newly formed fissures. In various embodiments, at least 10%, at least 20%, at least 30%, at least 40%, at least 50%, at least 60%, at least 70%, at least 80%, or at least 90%, and even more, of the volume of each of the fissures 18 will contain the slurry.

Therefore, it should be appreciated that the slurry may be held at the increased pressure for a time period of at least 1 minute, at least 5 minutes, at least 10 minutes, at least 30 minutes, at least 60 minutes, at least 120 minutes, at least 240 minutes, or at least 24 hours, and even more. The slurry may be held at the increased pressure for a time period of no greater than 48 hours, no greater than 24 hours, no greater than 240 minutes, no greater than 120 minutes, no greater than 60 minutes, no greater than 30 minutes, no greater than 10 minutes, no greater than 5 minutes, or no greater than 1 minute, and even less. The slurry may be held at the increased pressure for a time period of from 1 minutes to 48 hours, from 30 minutes to 24 hours, or from 60 minutes to 240 minutes.

Upon conclusion of filling the fissures with the high-thermal k material, the pressure at the target location will be reduced in an amount sufficient to partially close the fissures 18 to so expel at least some of the carrier fluid from the slurry in the fissures 18, thereby creating fissures 18 containing compacted high-thermal k material 20. In this context it should be appreciated that the pressure of the formation will effectively squeeze shut any void space in the high-thermal k material and as such ensure a low content of water in the high-thermal k material. Consequently, such compacted material will extend from a proximal end 22 to a distal end 24 in a continuous manner.

It is generally contemplated that the fissure geometries will generally extend from the wellbore into the rock formation of the target location, and the length of the fissures will typically be at least 1 m, or at least 2 m, or at least 5 m, or at least 5 m, or at least 15 m, or at least 20 m, or at least 25 m, and in some cases even more (as measured as a distance between the wellbore and the distal end of the fissure). In further contemplated aspects, it should be appreciated that the thickness (width) of the fissures will be significantly less as compared to rock fractures commonly used with oil and gas exploration. For example, suitable fissure thickness will be between 5 and 7.5 mm, or between 7.5 and 15 mm, or between 10 and 30 mm, or between 30 and 50 mm, and in some cases somewhat wider. Therefore, exemplary fissure structures may have a width between 5 and 30 mm, or between 10 and 50 mm, or between 25-80 mm. Most typically, the width of the fissure at the proximal end of the wellbore may be between 10 and 50 mm. Still further, and regardless of the specific configuration, it is generally preferred that the fissures in the target location will preferably not be a single linear break in the rock formation, but that the fissures form as a complex structure (such as a reticular or dendritic structure). Advantageously, such complex structure will provide for an even larger thermal exchange surface with the remainder of the unfractured rock in the target location. For example, the fissures may be formed to have a longitudinal complex multi-fractured geometry with a width of between 10 and 50 mm and a length of at least 10 m as measured from the wellbore.

Once the high-thermal k material has been compacted into the fissures, the slurry in annular space 26 can be replaced with a high-thermal conductivity composition 36 as is shown in FIG. 2. Here, it is once more pointed out that the high-thermal conductivity composition 36 will contact the proximal end 22 of the compacted high-thermal k material 20 and the outer surface of the casing 22. As discussed in more detail below, the high-thermal conductivity composition can be a cementitious composition that will harden in situ or a non-cementitious slurry, both of which will include a material with high thermal conductivity (e.g., graphite powder, flaked graphite, pyrolytic graphite, desulfurized petroleum coke, graphene, fly ash, copper powder, aluminum nitride, and/or silicon carbide). In some embodiments, it is preferred (but not necessary) that placing the high-thermal conductivity composition 36 is performed in a reverse circulation (as is, for example, described in PROCEEDINGS, Thirty-Fifth Workshop on Geothermal Reservoir Engineering, Stanford University, Stanford, California, Feb. 1-3, 2010).

With further reference to FIG. 2, in one embodiment, the high-thermal conductivity composition 36 is a high-thermal conductivity grout. The high conductivity grout may include a cementitious material and the high-thermal k material. In certain embodiments, the high conductivity grout further includes a retarder that allows placement of the high conductivity grout in the wells, even under extreme temperature conditions (e.g., at least 300° C.). Without being bound by theory, the inventors contemplate that the retarder is present in an amount effective that delays setting of the grout mixture at a target location having a target temperature of at least 300° C., at least 400° C., or at least 500° C., for at least two hours. Especially contemplated grout compositions are described in US Provisional application with the Ser. No. 63/305,599, filed Feb. 1, 2022, incorporated by reference herein.

In another embodiment, the high-thermal conductivity composition 36 is a compacted high-thermal conductivity slurry. The compacted high-thermal conductivity slurry may include the high-thermal k material in the form of particles have the wide size distribution. In certain embodiments, the compacted high-thermal conductivity slurry is substantially free of curable materials (e.g., cementitious materials) to remains moveable in the presence of substantial forces (e.g., earthquakes) for minimizing damage to the well and for improving workability of the slurry prior to compaction that allows placement of the slurry in the wells, even under extreme temperature conditions (e.g., at least 300° C.). Especially contemplated grout compositions are described in US Provisional application with the Ser. No. 63/305,639, filed Feb. 1, 2022, incorporated by reference herein.

The compacted high-thermal k material 20 may be formed from any high-thermal k material known in the art suitable for thermal conductivity and filling the plurality of fissures 18. To this end, as described in greater detail below, the high-thermal k material is compacted after being provided to the plurality of fissures to form the compacted high-thermal k material. The compacted high-thermal k material 20 may have a thermal conductivity of at least 20 W/m° K., at least 25 W/m° K., at least 30 W/m° K., at least 40 W/m° K., at least 50 W/m° K., at least 60 W/m° K., at least 70 W/m° K., or at least 80 W/m° K. Without wishing to be bound by any theory or hypothesis, it is contemplated that the compacted high-thermal k material 20 provides improved thermal conductivity as compared to the high-thermal k material prior to compaction.

Suitable high-thermal k materials used to form the compacted high-thermal k material may include, but are not limited to, graphite, sand, quartz silica, a carbon nanotube, graphene, boron nitride, brass, a brass alloy, chrome nickel steel, carbon steel, stainless steel, a transition metal (e.g., copper, cadmium, cobalt, gold, silver, iridium, iron, molybdenum, nickel, platinum, zinc, and the like), a transition metal alloy (e.g., a copper alloy, a cadmium alloy, a cobalt alloy, a gold alloy, a silver alloy, an iridium alloy, an iron alloy, a molybdenum alloy, a nickel alloy, a platinum alloy, a zinc alloy, and the like), a post-transition metal (e.g., lead, tin, and the like), a post-transition metal alloy (e.g., an lead alloy, a tin alloy, and the like), an alkaline earth metal alloy (e.g., a beryllium alloy, a magnesium alloy, and the like), or combinations thereof. In certain embodiments, the high-thermal k material is selected from the group consisting of graphite powder, exfoliated graphite, flaked graphite, pyrolytic graphite, desulfurized petroleum coke, graphene, fly ash, copper powder, aluminum nitride, silicon carbide, and combinations thereof.

As will be appreciated, the compacted high-thermal k material 20 may be provided to the plurality of fissures 18 as a slurry including the high-thermal k material and a carrier (e.g., water). In some embodiments, the high-thermal k material may be present in the slurry in an amount sufficient to provide the desired amount of thermal conductivity to the plurality of fissures 18. The high-thermal k material may be present in the slurry in an amount of at least 10 wt. %, at least 20 wt. %, at least 30 wt. %, at least 40 wt. %, at least 50 wt. %, at least 60 wt. %, at least 70 wt. %, at least 89 wt. %, at least 90 wt. %, at least 91 wt. %, at least 92 wt. %, at least 93 wt. %, at least 94 wt. %, at least 95 wt. %, at least 96 wt. %, at least 97 wt. %, at least 98 wt. %, or at least 99 wt. %, and even higher, based on a total weight of the slurry. Alternatively, the high-thermal k material may be present in the slurry in an amount of from about 1 to about 99 wt. %, from about 5 wt. % to about 99 wt. %, from about 40 wt. % to about 99 wt. %, or from about 80 wt. % to about 99 wt. %, based on a total weight of the slurry.

Moreover, the high-thermal k material may be in any form known in the art so long as the high-thermal k material can be provided to the plurality of fissures 18 and is capable of being compacted to form the compacted high-thermal k material 20. The terms "compacted" as utilized herein mean that the compacted slurry has (a) a decreased water content in an amount of at least 1 wt. %, 2 wt. %, 3 wt. %, 4 wt. %, 5 wt. %, 10 wt. %, 15 wt. %, 20 wt. %, 30 wt. %, 40 wt. %, 50 wt. %, 60 wt. %, 70 wt. %, 80 wt. % 90 wt. %, or 99 wt. % as compared to the slurry prior to compaction, (b) an increased density in an amount of at least 1 wt. %, 2 wt. %, 3 wt. %, 4 wt. %, 5 wt. %, 10 wt. %, 15 wt. %, 20 wt. %, 30 wt. %, 40 wt. %, 50 wt. %, 60 wt. %, 70 wt. %, 80 wt. % 90 wt. %, 100 wt. %, or even more as compared to the slurry prior to compaction, or (c) both (a) the decreased water content and (b) the increased density. In various embodiments, the high thermal k material may have an average particle size of between 0.1 μm and 5.0 mm.

Moreover, the high-thermal k material may be in a form of a plurality of particles having a wide size distribution or a narrow size distribution.

In further embodiments, where the high-thermal k material has a wide size distribution, the size distribution spans across at least 2 log units, at least 2.5 log units, or at least 3 log units. In some embodiments, the wide size distribution of the high thermal k material provides integrity to the form or configuration of the compacted high-thermal k material without the use of curable materials (e.g., cementitious materials). In embodiments when the high-thermal k material has a narrow size distribution, the size distribution spans across no greater than 2 log units, no greater than 1.5 log units, or no greater than 1 log unit. Because the high-thermal k material is substantially free of certain curable materials (e.g., cementitious materials), the high thermal k material remains moveable in the presence of substantial forces (e.g., earthquakes) for minimizing damage to the compacted high-thermal k material 20 in the plurality of fissures 18. Furthermore, the slurry including the high-thermal k material has improved workability that allows placement of the high-thermal k material in the plurality of fissures 18, even under extreme temperature conditions (e.g., at least 300° C.) resulting from the slurry being substantially free of certain curable materials (e.g., cementitious materials).

In still further contemplated aspects, it should be appreciated that the compacted high-thermal k material will form a fluid barrier and as such will protect the wellbore and closed loop working fluid conduit where water or hydrocarbonaceous fluids are present in the formation. However, and most typically, the target location is a dry and hot rock formation that will in most cases have low or no significant permeability (e.g., intrusive igneous or metamorphic rock). Moreover, due the significant pressure in the formation upon closing the fissures, the fissures will typically have void space of less than 25%, less than 20%, less than 15%, less than 10%, or less than 5% of the entire space of the fissure in the previously open configuration.

FIG. 3 schematically depicts an exemplary operation of an exemplary enhanced thermal reach geothermal wellbore according to the inventive subject matter. Here, a closed loop working fluid conduit comprising casing 13 and an inner conduit 28 are located in the wellbore 12 at the target location in the formation 16. As discussed above and as can be seen from FIG. 3, the casing 13 of the closed loop working fluid conduit is thermally coupled to the high-thermal conductivity composition 36, which in turn is thermally coupled to the compacted high-thermal k material 20 that extends distally from the target location into the plurality of fissures 18 in formation 16. In this example, heat from the formation 16 is transferred via the compacted high-thermal k material 20 in the fissures 18, the high-thermal conductivity composition 36, and casing 13 to a working fluid that flows downwardly through second annular space 32. The so heated working fluid reverses direction at he bottom of the casing and enters return space 30 that is formed by inner conduit 28. A heat exchanger at topside 14 (not shown) will then extract heat form the working fluid and returns the so cooled working fluid back downhole via second annular space 32 in the closed loop working fluid conduit. In less preferred aspects, the direction of the flow of the working fluid may be reversed.

Referring back to the slurry of the compacted high-thermal k material 20, the slurry may optionally include at least one functional agent, such as a plasticizer, a surfactant, and/or an organic polymer. The functional agent may be used to modify the rheological properties of the slurry in response to a variety of stimuli, such as temperature, pressure, contact with another material, or combinations thereof, or improve mixability of the slurry. The functional agent may be selected from the group consisting of a plasticizer, a surfactant, an organic polymer, a silica filler, a NaCl, KCl or other inorganic salt, a clay, and combinations thereof.

The plasticizer may be present in the slurry to improve workability for ease of placement. In various embodiments, the term "plasticizer" refers to a material that increases the fluidity of the slurry and thereby increases the workability of the slurry or permits the slurry to be made with a smaller amount of water while maintaining equal workability. Suitable plasticizers may include, but are not limited to, polycarboxylic ether plasticizers, phthalate plasticizers, terephthalate plasticizers, sulfonamide plasticizers, benzoate plasticizers, phosphate plasticizers, or combinations thereof.

In some embodiments, the plasticizer may be present in the slurry in an amount sufficient to provide the desired amount of workability to the slurry. The plasticizer may be present in the slurry in an amount of at least 1 wt. %, 2 wt. %, 3 wt. %, 4 wt. %, 5 wt. %, 6 wt. %, 7 wt. %, 8 wt. %, 9 wt. %, or 10 wt. %, based on a total weight of the slurry. Alternatively, the plasticizer may be present in the slurry in an amount of no greater than 20 wt. %, 19 wt. %, 18 wt. %, 17 wt. %, 16 wt. %, 15 wt. %, 14 wt. %, 13 wt. %, 12 wt. %, 11 wt. %, or 10 wt. %, based on a total weight of the slurry. Alternatively, the plasticizer may be present in the slurry in an amount of from about 1 to about 20 wt. %, from about 5 wt. % to about 15 wt. %, or from about 7 wt. % to about 13 wt. %, based on a total weight of the slurry.

The surfactant may be present in the slurry to improve surface properties of the slurry. Suitable surfactants may include, but are not limited to, a non-ionic surfactant, an anionic surfactant, a cationic surfactant, a zwitterionic surfactant, or combinations thereof.

Suitable non-ionic surfactants may include, but are not limited to, an alkyoxylate (e.g., an alkoxylated nonylphenol condensate, such as poly(oxy-1,2-ethanediyl), alpha-(4-nonylphenyl)-omega-hydroxy-branched), an alkylphenol, an ethoxylated alkyl amine, an ethoxylated oleate, a tall oil, an ethoxylated fatty acid, an alkyl polyglycoside, a sorbitan ester, a methyl glucoside ester, an amine ethoxylate, a diamine ethoxylate, a polyglycerol ester, an alkyl ethoxylate, an alcohol that has been polypropoxylated and/or poly-ethoxylated, a linear alcohol alkoxylate, dodecylbenzene sulfonic acid salt derivative, a linear nonyl-phenol, dioxane, ethylene oxide, polyethylene glycol, an ethoxylated castor oil, polyoxyethylene nonyl phenyl ether, tetraethyleneglycoldodecylether, ethylene oxide, decylamine oxide, dodecylamine oxide, an alkylamine oxide, an ethoxylated amide, an alkoxylated fatty acid, an alkoxylated alcohol (e.g., lauryl alcohol ethoxylate, ethoxylated nonyl phenol), an ethoxylated fatty amine, an ethoxylated alkyl amine (e.g., cocoalkylamine ethoxylate), any derivative thereof, and any combination thereof. As used herein, the term "derivative," refers to any compound that is made from one of the identified compounds, for example, by replacing one atom in the listed compound with another atom or group of atoms or rearranging two or more atoms in the listed compound.

Suitable anionic surfactants may include, but are not limited to, methyl ester sulfonate, a hydrolyzed keratin, polyoxyethylene sorbitan monopalmitate, polyoxyethylene sorbitan monostearate, polyoxyethylene sorbitan monooleate, an alkyl ether sulfate, sodium 4-(1'heptylnonyl) benzenesulfonate, sodium dioctyl sulphosuccinate, sodium octylbenzenesulfonate, sodium hexadecyl sulfate, sodium laureth sulfate, a quaternary ammonium compound (e.g., a trimethylcocoammonium chloride, a trimethyltallowammonium chloride, a dimethyldicocoammonium chloride, and the like), a cetylpyridinium chloride, an alkyl ester sulfonate, an alkyl ether sulfonate, an alkyl ether sulfate, an alkali metal alkyl sulfate, an alkyl sulfonate, an alkylaryl sulfonate, a sulfosuccinate, an alkyl disulfonate, an alkylaryl disulfonate, an alkyl disulfate, an alcohol polypropoxylated sulfate, an alcohol polyethoxylated sulfateany derivative thereof, or any combination thereof.

Suitable zwitterionic surfactants may include, but are not limited to, an alkyl amine oxide, an alkyl betaine, an alkyl arnidopropyl betaine, an alkyl sulfobetaine, an alkyl sultaine, a dihydroxyl alkyl glycinate, an alkyl ampho acetate, a phospholipid, an alkyl aminopropionic acid, an alkyl imino monopropionic acid, an alkyl imino dipropionic acid, dipalmitoyl-phosphatidylcholine, an amine oxide, a betaine, a modified betaine, an alkylamidobetaine (e.g., cocoamidopropyl betaine), and any combination thereof.

As example, surfactants that may exhibit viscoelastic properties may include, but are not limited to, a sulfosuccinate, a taurate, an amine oxide (e.g., an amidoamine oxide), an ethoxylated amide, an alkoxylated fatty acid, an alkoxylated alcohol, an ethoxylated fatty amine, an ethoxylated alkyl amine, a betaine, modified betaine, an alkylamidobetaine, a quaternary ammonium compound, an alkyl sulfate, an alkyl ether sulfate, an alkyl sulfonate, an ethoxylated ester, an ethoxylated glycoside ester, an alcohol ether, any derivative thereof, and any combination thereof.

In some embodiments, the surfactant may be present in the slurry in an amount sufficient to provide the desired amount of surface properties to the slurry. The surfactant may be present in the slurry in an amount of at least 1 wt. %, 2 wt. %, 3 wt. %, 4 wt. %, 5 wt. %, 6 wt. %, 7 wt. %, 8 wt. %, 9 wt. %, or 10 wt. %, based on a total weight of the slurry. Alternatively, the surfactant may be present in the slurry in an amount of no greater than 20 wt. %, 19 wt. %, 18 wt. %, 17 wt. %, 16 wt. %, 15 wt. %, 14 wt. %, 13 wt. %, 12 wt. %, 11 wt. %, or 10 wt. %, based on a total weight of the slurry. Alternatively, the surfactant may be present in the slurry in an amount of from about 1 to about 20 wt. %, from about 5 wt. % to about 15 wt. %, or from about 7 wt. % to about 13 wt. %, based on a total weight of the slurry.

The organic polymer may be present in the slurry to improve properties of the slurry. Suitable organic polymers may include, but are not limited to, natural compounds, synthetic compounds, or a combination thereof. Non-limiting examples of suitable natural compounds include polysaccharides, such as polysaccharides and polysaccharide ethers which are soluble in cold water, such as cellulose ethers, starch ethers (amylose and/or amylopectin and/or derivatives thereof), guar ethers dextrins, or combinations thereof. Non-limiting examples of suitable synthetic compounds include protective colloids, for example one or more polyvinylpyrrolidones and/or polyvinylacetals, polyvinyl alcohols, melamine formaldehyde sulfonates, naphthalene formaldehyde sulfonates, block copolymers of propylene oxide and ethylene oxide, styrene-maleic acid and/or vinyl ether-maleic acid copolymers.

In some embodiments, the organic polymer may be present in the slurry in an amount sufficient to provide the desired amount of properties to the slurry. The organic polymer may be present in the slurry in an amount of at least 1 wt. %, 2 wt. %, 3 wt. %, 4 wt. %, 5 wt. %, 6 wt. %, 7 wt. %, 8 wt. %, 9 wt. %, or 10 wt. %, based on a total weight of the slurry. Alternatively, the organic polymer may be present in the slurry in an amount of no greater than 20 wt. %, 19 wt. %, 18 wt. %, 17 wt. %, 16 wt. %, 15 wt. %, 14 wt. %, 13 wt. %, 12 wt. %, 11 wt. %, or 10 wt. %, based on a total weight of the slurry. Alternatively, the organic polymer may be present in the slurry in an amount of from about 1 to about 20 wt. %, from about 5 wt. % to about 15 wt. %, or from about 7 wt. % to about 13 wt. %, based on a total weight of the slurry.

Where desired, a silica filler may be present in the slurry to improve properties of the slurry. Suitable silica filler may be a pyrogenic or precipitated finely-divided silica. The silica filler may have a particle size of from about 50 to 10,000 angstroms, from about 50 to about 400, or from about 100 to about 300 angstroms. The silica filler may be present in the slurry in an amount of at least 1 wt. %, 2 wt. %, 3 wt. %, 4 wt. %, 5 wt. %, 6 wt. %, 7 wt. %, 8 wt. %, 9 wt. %, or 10 wt. %, based on a total weight of the slurry. Alternatively, the silica filler may be present in the slurry in an amount of no greater than 20 wt. %, 19 wt. %, 18 wt. %, 17 wt. %, 16 wt. %, 15 wt. %, 14 wt. %, 13 wt. %, 12 wt. %, 11 wt. %, or 10 wt. %, based on a total weight of the slurry. Alternatively, the silica filler may be present in the slurry in an amount of from about 1 to about 20 wt. %, from about 5 wt. % to about 15 wt. %, or from about 7 wt. % to about 13 wt. %, based on a total weight of the slurry.

The inorganic salt may be present in the slurry to improve mixability of the slurry. Suitable inorganic salts may include, but are not limited to, NaCl, KCl, and the like. The inorganic salt may be present in the slurry in an amount of at least 1 wt. %, 2 wt. %, 3 wt. %, 4 wt. %, 5 wt. %, 6 wt. %, 7 wt. %, 8 wt. %, 9 wt. %, or 10 wt. %, based on a total weight of the slurry. Alternatively, the inorganic salt may be present in the slurry in an amount of no greater than 20 wt. %, 19 wt. %, 18 wt. %, 17 wt. %, 16 wt. %, 15 wt. %, 14 wt. %, 13 wt. %, 12 wt. %, 11 wt. %, or 10 wt. %, based on a total weight of the slurry. Alternatively, the inorganic salt may be present in the slurry in an amount of from about 1 to about 20 wt. %, from about 5 wt. % to about 15 wt. %, or from about 7 wt. % to about 13 wt. %, based on a total weight of the slurry.

The clay may be present in the slurry to modify flowability of the slurry. Suitable clay may include a member of the smectite family, a member of the palygorskite-sepiolite phyllosilicate family, a member of the kaolinite-serpentine family, nontronite, bentonite, hectorite, attapulaite, fluoromica, montmorillonite, beidellite, saponite, sepiolite, kaolinite, illite, any cation exchanged version thereof, or combinations thereof.

Of the suitable smectite family clays including nontronite, montmorillonite, saponite, hectorite, and beidellite, other suitable smectite family clays for use as the aqueous swellable clays of the present disclosure may include, but are not limited to, aliettite, ferrosaponite, sauconite, stevensite, swinefordite, volkonskoite, yakhontovite, and any combination thereof. Suitable members of the palygorskite-sepiolite pyhyllosilicate family may include, but are not limited to, attapulgite, tuperssautsiaite, windhoekite, yofortierite, falcondoite, ferrisepiolite, loughlinite, and any combination thereof. Suitable members of the kaolinite-serpentine family of aqueous swellable clays may include, but are not limited to, kaolinite, greenalite, fraipontite, halloysite, dickite, lizardite, manandonite, nacrite, cronstedtite, clinochrysotile, chrysotile, nepouite, odinite, webskyite, pecoraite, orthochrysotile, parachrysotile, caryopilite, brindleyite, berthierine, amesite, antigorite, baumite, and any combination thereof.

In some embodiments, the clay may be present in the slurry in an amount sufficient to provide the desired amount of properties to the slurry. The clay may be present in the slurry in an amount of at least 1 wt. %, 2 wt. %, 3 wt. %, 4 wt. %, 5 wt. %, 6 wt. %, 7 wt. %, 8 wt. %, 9 wt. %, or 10 wt. %, based on a total weight of the slurry. Alternatively, the clay may be present in the slurry in an amount of no greater than 20 wt. %, 19 wt. %, 18 wt. %, 17 wt. %, 16 wt. %, 15 wt. %, 14 wt. %, 13 wt. %, 12 wt. %, 11 wt. %, or 10 wt. %, based on a total weight of the slurry. Alternatively, the clay may be present in the slurry in an amount of from about 1 to about 20 wt. %, from about 5 wt. % to about 15 wt. %, or from about 7 wt. % to about 13 wt. %, based on a total weight of the slurry.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. As also used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

What is claimed is:

1. A method of enhancing thermal reach in a geothermal wellbore, comprising:
    forming a geothermal wellbore that extends from a topside surface to a target location in a formation, wherein the formation is a formation with low or no permeability;
    pumping a fluid into a wellbore to a target location in the formation;
    increasing pressure of the fluid at the target location to a fracture pressure that is sufficient to open a plurality of fissures at the target location in the formation;
    pumping at the fracture pressure or a pressure higher than the fracture pressure a slurry comprising a high-thermal k material dispersed in a carrier fluid into the wellbore to allow the slurry to at least partially fill the fissures;
    reducing pressure at the target location and the fissures to thereby partially close the fissures to so expel at least some of the carrier fluid from the slurry in the fissures, thereby creating fissures containing compacted high-thermal k material;
    wherein the compacted high-thermal k material terminates on a proximal end at the wellbore and extends to a distal end within the formation; and
    installing a high-thermal conductivity composition in the wellbore, wherein the high-thermal conductivity composition contacts the proximal end of the compacted high-thermal k material and an outer surface of a casing located in the wellbore.

2. The method of claim 1, wherein the fluid is water.

3. The method of claim 1, wherein target location is at least 500 ft below ground, and/or wherein the target location has a target temperature of at least 300° C.

4. The method of claim 1, wherein the fissures distally extend from the wellbore over a distance of at least 3 feet, and/or wherein the high-thermal k material is selected from the group consisting of graphite powder, flaked graphite, pyrolytic graphite, desulfurized petroleum coke, graphene, fly ash, copper powder, aluminum nitride, and silicon carbide.

5. The method of claim 1, wherein the slurry comprises water, the high-thermal k material, and optionally a plasticizer, a surfactant, an organic polymer, or combinations thereof.

6. The method of claim 1, wherein the target location extends in a vertical orientation, and wherein the fissures have a longitudinal orientation.

7. The method of claim 1, wherein the compacted high-thermal k material has a thermal conductivity of at least 20 W/m° K.

8. The method of claim 1, wherein the high-thermal conductivity composition comprises a cementitious composition or a slurry comprising a high-thermal k material selected from the group consisting of graphite powder, flaked graphite, pyrolytic graphite, desulfurized petroleum coke, graphene, fly ash, copper powder, aluminum nitride, and silicon carbide.

9. The method of claim 8 wherein the high-thermal conductivity composition is a high-thermal conductivity grout or wherein the slurry is a compacted slurry.

10. A thermal reach enhanced geothermal wellbore, comprising:
    a wellbore extending from a topside surface to a target location in a formation, wherein the formation is a formation with low or no permeability;

wherein a plurality of fissures distally extend from the target location into the formation and are at least partially filled with a compacted high-thermal k material;

wherein the compacted high-thermal k material terminates on a proximal end at the target location of the wellbore; and wherein the wellbore further comprises a high-thermal conductivity composition that contacts the proximal end of the compacted high-thermal k material and an outer surface of a casing located in the wellbore.

11. The wellbore of claim 10, wherein the target location is at least 500 ft below ground and/or wherein the target location has a target temperature of at least 300° C.

12. The wellbore of claim 10, wherein the fissures distally extend from the wellbore over a distance of at least 3 feet, and/or wherein the compacted high-thermal k material is selected from the group consisting of graphite powder, flaked graphite, pyrolytic graphite, desulfurized petroleum coke, graphene, fly ash, copper powder, aluminum nitride, and silicon carbide.

13. The wellbore of claim 10, wherein the compacted high-thermal k material has a thermal conductivity of at least 20 W/m° K.

14. The wellbore of claim 10, wherein the high-thermal conductivity composition comprises a cementitious composition or a slurry comprising a high-thermal k material selected from the group consisting of graphite powder, flaked graphite, pyrolytic graphite, desulfurized petroleum coke, graphene, fly ash, copper powder, aluminum nitride, and silicon carbide.

15. The wellbore of claim 14, wherein the high-thermal conductivity composition comprises a grout composition.

16. The wellbore of claim 14, wherein the high-thermal conductivity composition is the slurry, and wherein the slurry is a compacted slurry.

* * * * *